US008065198B2

(12) United States Patent
Fuxman et al.

(10) Patent No.: US 8,065,198 B2
(45) Date of Patent: Nov. 22, 2011

(54) PROVIDING TIME-SENSITIVE INFORMATION FOR PURCHASE DETERMINATIONS

(75) Inventors: Ariel Fuxman, Mountain View, CA (US); Samuel Ieong, Palo Alto, CA (US); Raja Palani Velu, Manlius, NY (US); Rakesh Agrawal, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 273 days.

(21) Appl. No.: 12/463,831

(22) Filed: May 11, 2009

(65) Prior Publication Data
US 2010/0287060 A1    Nov. 11, 2010

(51) Int. Cl.
 *G06Q 30/00* (2006.01)
(52) U.S. Cl. ............... 705/26.7; 705/26.1; 705/26.61
(58) Field of Classification Search ............... 705/25–30
See application file for complete search history.

(56) References Cited

U.S. PATENT DOCUMENTS

| | | | |
|---|---|---|---|
| 6,631,356 B1 | 10/2003 | Van Horn | |
| 7,203,662 B2 | 4/2007 | Das | |
| 2001/0039519 A1 | 11/2001 | Richards | |
| 2002/0089534 A1 | 7/2002 | Siekmann | |
| 2002/0143665 A1* | 10/2002 | Santos et al. | .................... 705/28 |
| 2003/0050895 A1 | 3/2003 | Dedrick | |
| 2004/0143477 A1* | 7/2004 | Wolff | ................. 705/9 |
| 2005/0187744 A1* | 8/2005 | Morrison et al. | ................. 703/2 |
| 2006/0161480 A1 | 7/2006 | Christensen | |

OTHER PUBLICATIONS

Product Forecasting: Code of Practice http://www.openreach.co.uk/orpg/products/forecasting/downloads/Product%20Forecasting%20Code%20of%20Practice_Issue%201.pdf, Date: Dec. 11, 2008.
Information you can Manage http://www.oracle.com/media/peoplesoft/en/pdf/brochures/jdedwards-world-distribution-management.pdf.
Analyst Forecast Revision and Market Sales Discovery of Online Word of Mouth http://ieeexplore.ieee.org/stamp/stamp.jsp?arnumber=04076805, Date: Aug. 2007.
Non-Linear Time-Cost Break Even Research in Product Lifecycle http://internet.ktu.lt/lt/mokslas/zurnalai/inzeko/46/1392-2758-2006-1-46-07.pdf, Dec. 2005.

\* cited by examiner

*Primary Examiner* — Matthew Gart
*Assistant Examiner* — Ig T An
(74) *Attorney, Agent, or Firm* — Shook Hardy & Bacon LLP

(57) ABSTRACT

A method, system, and medium are provided that are directed to providing a user with time-sensitive information that is usable to determine when to purchase a product. In accordance with embodiments of the technology, exemplary steps include using historical product information to generate time-sensitive information. Moreover, in response to receiving from a user a request to receive information describing a given product, time-sensitive information is caused to be presented. For example, time-sensitive information might be usable by the user to determine when to purchase the given product and an alternative product.

9 Claims, 6 Drawing Sheets

US 8,065,198 B2

PROVIDING TIME-SENSITIVE INFORMATION FOR PURCHASE DETERMINATIONS

BACKGROUND

A consumer often uses a search engine to retrieve information about a product that he or she is considering purchasing. For example, the consumer might submit a search query and expect to receive information that describes a product's specifications and purchase price. While information describing specifications and prices can be helpful to a consumer, additional types of information would better assist the consumer to make a more informed choice about whether to make a purchase.

SUMMARY

Embodiments of the invention are defined by the claims below, not this Summary. A high-level overview of various aspects of the invention are provided here for that reason, to provide an overview of the disclosure, and to introduce a selection of concepts that are further described in the Detailed Description. This Summary is not intended to identify key features or essential features of the claimed subject matter, nor is it intended to be used as an aid in isolation to determine the scope of the claimed subject matter.

One embodiment of the present invention is directed to a computer-implemented method of providing a user with time-sensitive information that is usable to determine when to purchase a product. Time-sensitive information includes information that is predicted using historical product information that describes the product. The time-sensitive information is caused to be presented to the user in response to a request, e.g., product search query, from the user to receive information that describes the product. Time-sensitive information might describe the product for which the user searched, in addition to, products that are usable as alternatives to the searched-for product.

BRIEF DESCRIPTION OF THE DRAWINGS

Illustrative embodiments of the present invention are described in detail below with reference to the attached drawing figures, wherein.

DETAILED DESCRIPTION

Figure 1:
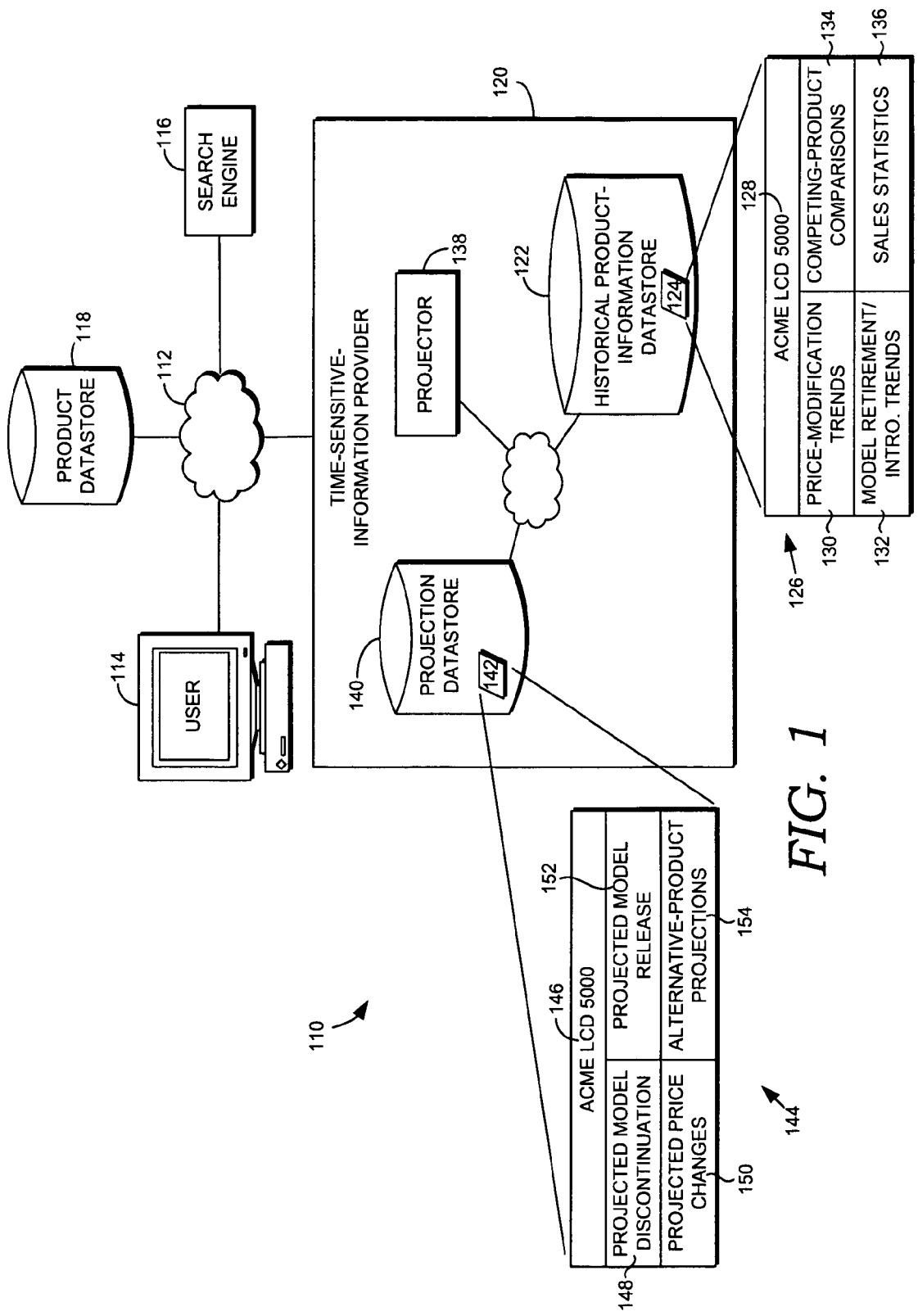
FIG. 1 is a schematic diagram of an illustrative operating environment suitable for providing a user with time-sensitive information, in accordance with an embodiment of the present invention.

The subject matter of embodiments of the present invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly stated.

Embodiments of the present invention are directed to providing a user with time-sensitive information that is usable to determine when to purchase a product. With initial reference to FIG. 1, an illustrative operating environment suitable for practicing an embodiment of the present invention is provided and referenced generally by reference numeral 110. The operating environment 110 includes various components, which communicate by way of network 112. Components include a user device 114, a search engine 116, a product datastore 118, and a time-sensitive-information provider 120.

One or more of components 114, 116, 118, and 120 include a computing device. Each of components 114, 116, 118, and 120 might include an independent computing device, which is separate from other components depicted in FIG. 1. Alternatively, one or more of components 114, 116, 118, and 120 might be combined in a single computing device. For example, search engine 116, product datastore 118, and time-sensitive-information provider 120 might include a single computing device.

Figure 2:
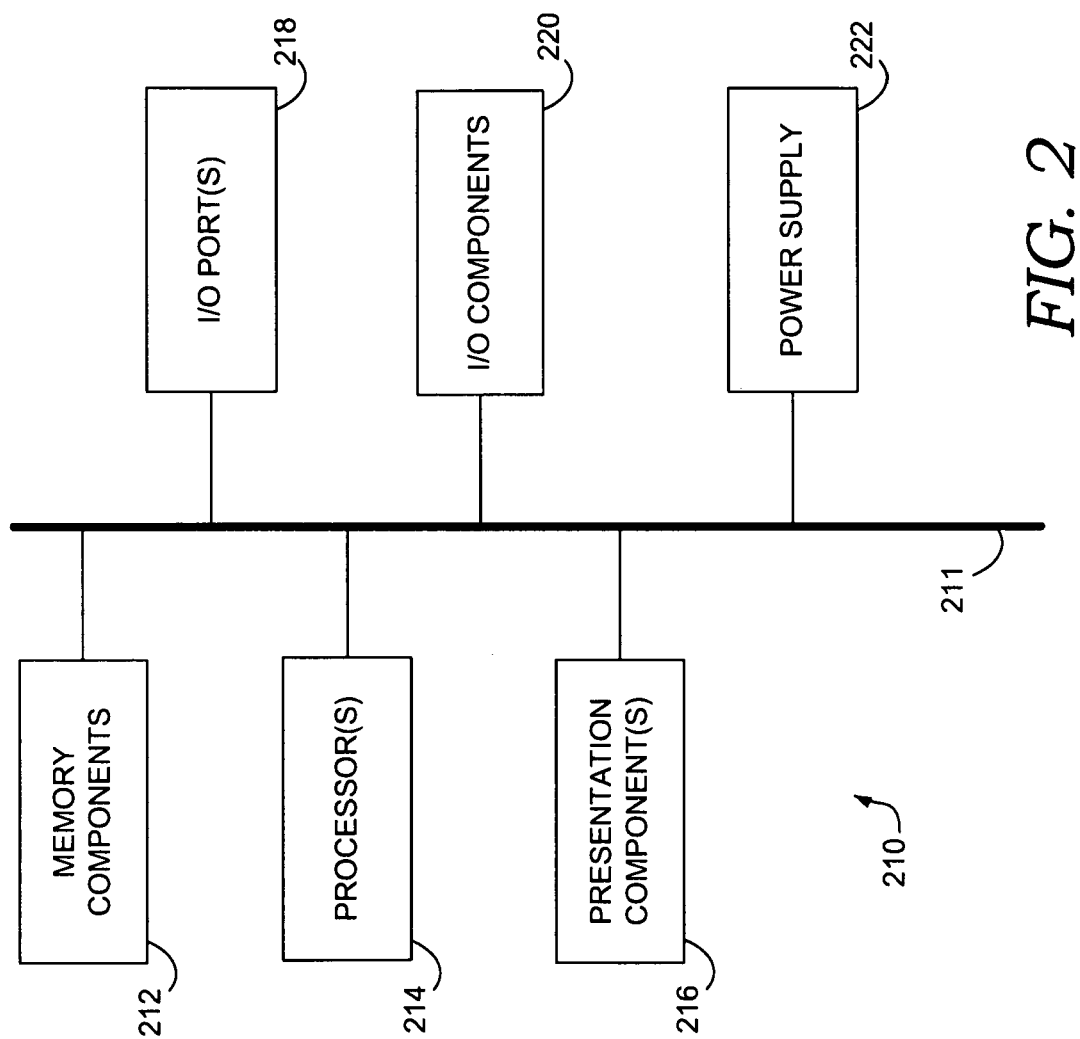
FIG. 2 depicts a block diagram illustrating certain components of an illustrative computing device suitable for practicing an embodiment of the present invention.

In FIG. 2, a diagrammatic block diagram of an exemplary computing device 210 is provided, in which device 210 might take the form of a conventional computer as well as a consumer electronics device, such as an Internet-connected watch, mobile phone, and the like. The computing device 210 might take on a variety of forms, including, for example, a computing device such as a gaming console, a client computer, a server computer, variations thereof such as laptop computers and palm-top computers, and in some embodiments devices such as PDAs and smart phones. As shown in FIG. 2, a bus 211 couples one or more memory components 212 to one or more processors 214, various presentation components 216, input/output ports 218, input/output components 220, and at least one power supply 222. Other devices including lower-level aspects of the shown devices are not shown so as to not obscure a description of the technology.

Memory components 212 include things such as a hard drive, volatile memory (such as RAM), buffers, and the like. The one or more processors 214 control overall data communications throughout the computing device 210. Illustrative presentation components 216 include a video card as well as a monitor, a speaker, a vibrating component, or other presentation device. Input/output ports 218 provide connectivity to peripheral components such as printers, digital cameras, and the like. Actual input/output (I/O) components 220 may be things like a microphone, joystick, game pad, satellite dish, scanner, printer, wireless device, and the like. A power supply 222 provides power to run the computing device 210. Not all of the components shown in FIG. 2 need to be present in order to make up a computing device but are shown for illustrative purposes in connection with describing one or more embodiments of the invention.

Although the various blocks of FIG. 2 are shown with lines for the sake of clarity, in reality, delineating various components is not so clear and, metaphorically, the lines would more accurately be gray and fuzzy. For example, one may consider a presentation component such as a display device to be an I/O component 220. Also, processors have memory. The inventors hereof recognize that such is the nature of the art and reiterate that the diagram of FIG. 2 is merely illustrative of an exemplary computing device that can be used in connection with one or more embodiments of the present invention.

The computing device 210 typically includes a variety of computer-readable media. By way of example, and not limitation, computer-readable media might comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; or magnetic cassettes, magnetic tape, magnetic disk storage or other magnetic storage devices. These technologies can store data momentarily, temporarily, or permanently.

Embodiments of the invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that performs particular tasks or implements particular abstract data types. Embodiments of the invention may be practiced in a variety of system configurations, including handheld devices, consumer electronics, general-purpose computers, more specialty computing devices, and the like. Embodiments of the invention may also be practiced in distributed computing environments where tasks are performed by remote-processing devices that are linked through a communications network.

One exemplary embodiment of the present invention includes a computer-implemented method of providing a user with time-sensitive information that is usable to determine when to purchase a given product, the method implemented with one or more of a processor and at least one computer-readable medium. The computer-implemented method comprises referencing historical product information that describes the given product and that is usable to predict the time-sensitive information; based on the historical product information, generating time-sensitive information, which includes one or more of: a projected discontinuation time frame that describes a first predicted future date on which the given product will no longer be available to be purchased and a projected release time frame that describes a second predicted future date on which a new product that is usable to replace the given product will become available to be purchased; modifying a data structure in a datastore to include the time-sensitive information; and causing the time-sensitive information to be presented to the user in response to a request from the user to receive information that describes the given product.

Another exemplary embodiment of the present invention includes one or more computer-readable media having computer-executable instructions embodied thereon, that when executed, cause a computing device to perform a method of providing a user with time-sensitive information that is usable to determine when to purchase a product. The method comprises receiving from the user a request to receive information describing one or more products, wherein the request includes specified product parameters that are usable to identify features of the one or more products; identifying a first subset of the one or more products that satisfies the specified product parameters, wherein the first subset of the one or more products satisfies the specified product parameters at a time at which the request is received; retrieving time-sensitive information that is usable to determine when to purchase a second subset of the one or more products; based on the time-sensitive information, identifying from the second subset of the one or more products an alternative product that is usable as an alternative to a product of the first set of the one or more products and that is described by alternative product parameters, which are predicted to undergo a change on a future date, wherein due to the change the alternative product parameters will satisfy on the future date the specified product parameters; and causing information describing the alternative product to be presented to the user.

A further exemplary embodiment of the present invention includes one or more computer-readable media having computer-executable instructions embodied thereon, that when executed, cause a computing device to perform a method of providing a user with time-sensitive information that is usable to determine whether to purchase a given product. The method comprises receiving from the user a request to receive information describing one or more products, wherein the request includes a specified purchase price; identifying a product that is available to be purchased, wherein the product is available to be purchased both at a time at which the request is received and in exchange for an amount that is not greater than the specified purchase price; retrieving a first set of time-sensitive information, which includes one or more of: a projected discontinuation time frame that describes a first predicted future date on which the product will no longer be available to be purchased, and a projected release time frame that describes a second predicted future date on which a new product that is usable to replace the product will be available to be purchased; referencing a second set of time-sensitive information that describes predicted information relating to an alternative product, which is both usable as an alternative to the product and available to be purchased at the time the request is received for an amount that is greater than the specified purchase price; based on the second set of time-sensitive information, determining that the alternative product will be available to be purchased on a third predicted future date in exchange for an amount that is not greater than the specified purchase price; and causing information describing the product to be presented to the user together with information describing the alternative product.

Having briefly described an overview of embodiments of the present invention, an exemplary operating environment in which various aspects of the present invention may be implemented is now described. Returning now to FIG. 1, an illustrative operating environment 110 is shown. The user device 114, the product datastore 118, the search engine 116, and the time-sensitive-information provider 120 communicate by way of the network 112. In exemplary aspects, the user device 114 submits a search query, which requests to receive information describing products, e.g., consumer products, to the search engine 116. A search query might be received in various forms. For example, a search query might include a set of terms that are input by the user 114 into a browser, which functions to submit the search query to the search engine 116. Alternatively, a search query might include an input of an electronic image of one or more products. For example, a user might use an input device, e.g., mouse, to select on a display an electronic image of a product, thereby submitting the product as the subject of a search query. A search query can also include various information and/or requests. For example, a query can request information about a specific product, e.g., ACME LCD 5000. Alternatively, a query can request information about products that have specified parameters, e.g., purchase price, specifications, capabilities, brand, etc.

Upon receiving a search query, the search engine 116 accesses the product datastore 118 to generate a list of products and information that satisfy the search query. For example, the user device 114 might submit a request to receive information describing an ACME LCD 5000 or describing consumer products that meet specified parameters. The user device 114 might expect to receive in return a list of products that satisfy the query, in addition to, predetermined static information, such as current purchase price, specifications, capabilities, and locations at which the products can be purchased. These types of information are referred to as "static" because the information describes an actual state of a product at a present time and is predetermined by a party, e.g., manufacturer or retailer; however, static does not mean the information cannot change. For example, static information, e.g., current purchase price, can change if a party, e.g., retailer, actively changes the static information.

However, in addition to predetermined static information, other types of information can also be useful to a user searching for a product, such as when the user device 114 is trying to decide whether to purchase a product. For example, the user device 114 might want to know if and when a product will be discontinued; when a new model that is usable to replace a current model will be released; what are present alternatives to a product given a fixed budget; what will be future alternatives based on a fixed budget; and when and whether a product's purchase price is likely to increase or decrease. Accordingly, aspects of the present invention include providing dynamic time-sensitive information that is usable to determine when to purchase a product. Briefly, "time-sensitive information" describes information that is projected by applying a forecast model to a set of historical product information and that is usable to determine when to purchase a product, as more fully described below.

"Historical product information," which is usable to predict time-sensitive information, refers to information that describes a product at an instant in time, e.g., specific date or time frame, which has already passed. In addition to describing a specific instant in time, e.g., past date, historical product information can describe trends from one instant in time to another instant in time. In embodiments of the present invention, historical product information describes fluctuations in a purchase price of a product, such as past trends in price increases or decreases. Historical product information also includes past time spans during which a product was available to be purchased. For example, historical product information might describe that a product was available to be purchased between Jan. 1, 2005, and Jan. 1, 1006, or that a product was available to be purchased during a period of 12 months. Historical product information can describe past instants in time when a product was retired or discontinued, i.e., no longer available to be purchased, as well as past instants in time when a new product, which is usable to replace a product, became available to be purchased. Historical product information also describes sale-transaction statistics, such as sale-transactions completed in a specified time frame in which a certain product was purchased. Moreover, historical product information can include comparisons between a product and alternative and/or competing products, e.g., a comparison between sale-transaction statistics of one product and sale-transaction statistics of a competing product.

FIG. 1 depicts a historical product-information datastore 122, which includes data 124. An expanded window 126 of the data 124 is included for illustrative purposes; however, the data 124 can include additional information as well. The expanded window 126 depicts various categories of historical product information that are stored with respect to a product identified as "ACME LCD 5000" 128. In embodiments of the present invention, the historical product-information datastore 122 stores information that describes products that are included in the product datastore 118. Illustrative examples of historical product information include price-modification trends 130, model retirement/introduction trends 132, competing-product comparisons 134, and sales statistics 136. Although the competing-product comparisons 134 are depicted as part of a group of information that is related to ACME LCD 5000, the competing-product comparisons 134 might also be stored separately or otherwise mapped to information stored in relation to ACME LCD 5000. In embodiments of the present invention, historical product information 130, 132, 134, and 136 is tracked and updated.

As previously indicated, time-sensitive information can be projected using historical product information 130, 132, 134, and 136. In embodiments of the present invention, because time-sensitive information is predicted using historical product information 130, 132, 134, and 136, time-sensitive information changes from a present instant in time to a subsequent instant in time consistent with changes in historical product information 130, 132, 134, and 136, i.e., as time progresses, information that exists at a present instant in time quickly becomes historical information as time passes to a next instant in time. Time-sensitive information might be used for a variety of purposes. In embodiments of the present invention, time-sensitive information provides an indication as to when a particular product will be discontinued or retired, when a new product will be released into the market, and when and how a purchase price for a product is expected to change. Moreover, time-sensitive information can provide an indication as to when other products will experience purchase price declines, which might bring the other products under a fixed budget.

FIG. 1 depicts a projector 138, which is usable to forecast time-sensitive information based on historical product information 130, 132, 134, and 136. In embodiments of the present invention, the projector 138 applies various prediction models and/or algorithms to historical product information 130, 132, 134, and 136 to forecast time-sensitive information. For example, the projector 138 might apply a simple moving average, an exponential moving average, a random walk, and a price regression. In other aspects, the projector 138 might use sale-transaction statistics to determine if a new model is likely to be released. For example, if sale-transaction statistics indicate that the number of purchases of a given product within a time duration has leveled or declined, i.e., that a market is saturated with the given product and that sales are not likely to improve, the projector 138 might predict that the given product is likely to be discontinued and/or that a new model is likely to be released. In another example, a comparison of sales statistics between products might enable forecasts to be made as to which product will be retired at an earlier instant in time. Time-sensitive information that is generated by the projector 138 is stored in a projection datastore 140.

The projection datastore 140 includes data 142, which is shown in an expanded window 144 for illustrative purposes. The expanded window 144 depicts a product labeled "ACME LCD 5000" 146, as well as, exemplary categories of time-sensitive information. Exemplary categories of time-sensitive information include projected model discontinuation 148, projected price changes 150, projected model release 152, and alternative-product projections 154. The projected model discontinuation 148 describes a predicted future instant in time in which it is predicted that the ACME LCD 5000 146 will no longer be available to be purchased. The projected price changes 150 describe a purchase price of the ACME LCD 5000 146 and how that purchase price is predicted to change over a given time frame or on a given date. The projected model release 152 describes a predicted future time duration in which it is predicted that a new model, which is usable to replace the ACME LCD 5000 146, will become available to be purchased. The alternative-product projections 154 include predicted information, e.g., discontinuation dates, new-model release dates, price changes, etc., that describes products that are usable as an alternative to the ACME LCD 5000 146. For example, an alternative product might be a product that competes against the ACME LCD 5000 146 to acquire market share. The alternative-product projections 154 are shown for illustrative purposes as part of the data 142; however, the alternative-product projections 154 might also be stored separately or otherwise mapped to information stored in relation to ACME LCD 5000 146. These examples of time-sensitive information 148, 150, 152, and 154 are provided for illustrative purposes; however, time-sensitive information can include a variety of other categories of information, which can be projected using historical product information. In embodiments of the present invention, as historical product information 130, 132, 134, and 136 is updated, so is the data 142. For example, upon tracking a change in historical product information 130, 132, 134, and 136, the projector 138 generates updated time-sensitive information 148, 150, 152, and 154, which is used to update a data structure in the projection datastore 140.

In embodiments of the present invention, time-sensitive information 148, 150, 152, and 154 is provided to describe a nonperishable product. A nonperishable product does not expire or become unusable at a predetermined future date. As such, the ability to forecast time-sensitive information is not dependent on a known predetermined future date. This is in contrast to a perishable product (e.g. food, dated travel tickets, dated hotel rooms, dated rental cars, etc.), which does expire or become unusable. Information, e.g., future price, describing a perishable product is predictable based on the expected expiration. For example, it can be assumed that a purchase price of a perishable product will decline as an expiration date approaches. Accordingly, some embodiments of the present invention are directed to providing time-sensitive information that describes non-perishable products, such as by applying a model and/or algorithm to historical product information, i.e., predicted product information is not generated by simply making an estimation based only on a predetermined expiration date.

Figure 3:
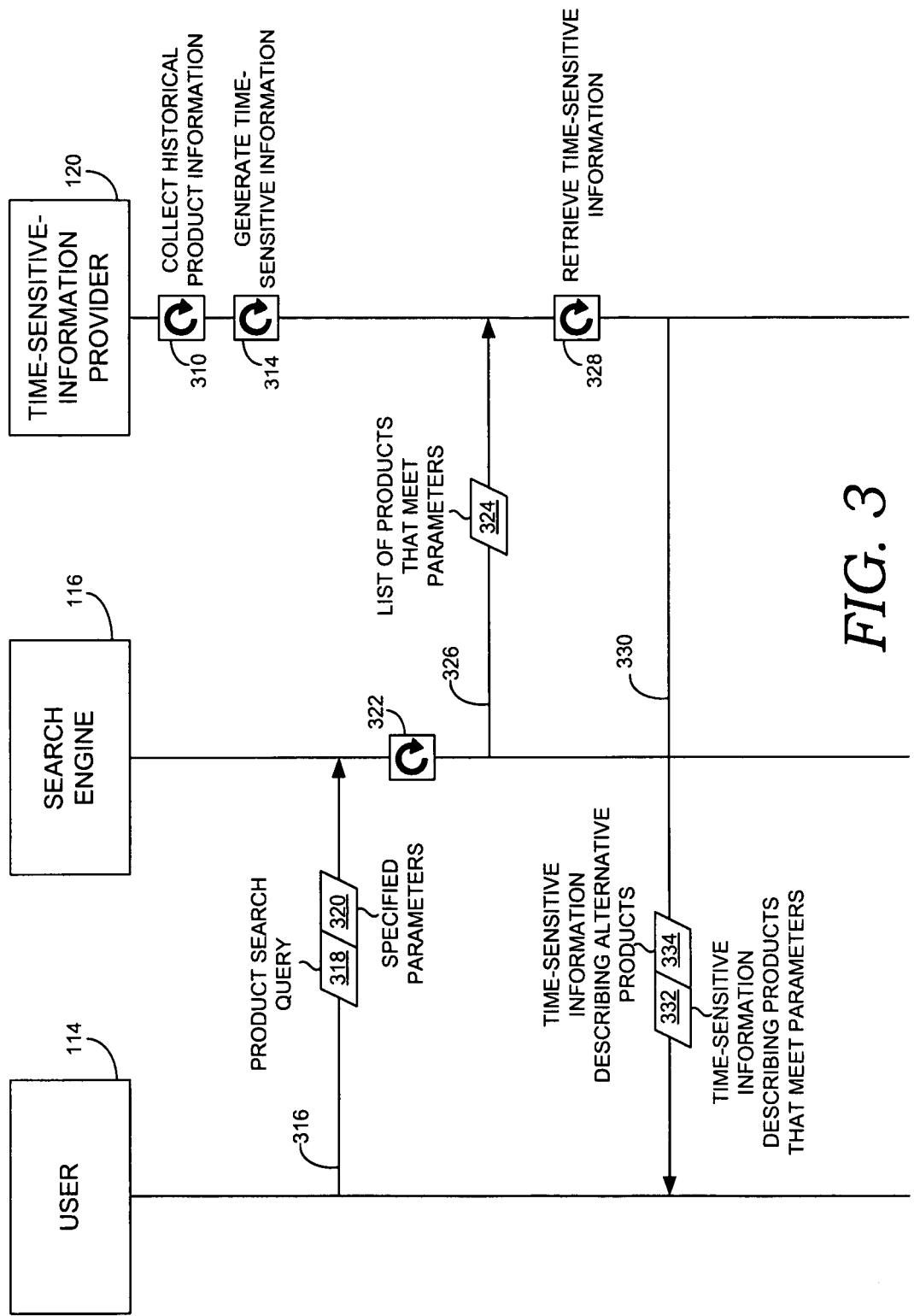
FIGS. 3-6 each depict a flow diagram showing an illustrative method of providing a user with time-sensitive information, in accordance with various embodiments of the present invention.

In embodiments of the present invention, time-sensitive information 130, 132, 134, and 136, or a derivative thereof, is provided to a user and is usable to determine whether and/or when to purchase a product. Referring now to FIG. 3, an exemplary interaction between components of FIG. 1 is depicted. At step 310, the time-sensitive-information provider 120 collects historical product information, e.g., the data 124 of FIG. 1. Step 314 includes generating time-sensitive information, e.g., the data 142 is generated by the projector 138 using the data 124. At step 316 a product search query 318 is communicated together with specified parameters 320 from the user device 114 to the search engine 116. At step 322, the search engine 116 generates product search results 324, which lists products ("identified products") that meet specified parameters 320. Step 326 includes communicating product search results 324 to the time-sensitive-information provider 120.

Upon receiving the list 324 describing identified products, the time-sensitive-information provider 120 retrieves at step 328 time-sensitive information that describes the identified products, i.e., "searched-for products." For example, the time-sensitive-information provider 120 might retrieve a projected discontinuation time frame, projected price changes, and new-product projected release dates. In addition, the time-sensitive-information provider 120 retrieves time-sensitive information that describes alternative products, which are usable as alternatives to the identified products. In one embodiment, alternative-product projections are stored in connection with identified products, such that alternative-product projections, e.g., 154 of FIG. 1, can be referenced upon receipt of the list 324. While alternative products might be identified in the list 324 (products that meet specified parameters), in some embodiments, due to specified parameters 320, alternative products are excluded from the list 324. For example, a product that is usable as an alternative to a searched-for product might have different parameters, e.g., purchase price and higher capabilities, which cause the alternative product to be excluded from the list 324. However, time-sensitive information describing the alternative product is still usable to determine whether and/or when to purchase the searched-for product(s). For example, time-sensitive information that describes an alternative product might indicate that in the near future a purchase price of the alternative product will decline or a new model of the alternative product will be released. Both examples of time-sensitive information, which describes the alternative product, might be usable to determine whether and/or when to purchase a searched-for product because time-sensitive information describing the alternative product provides information about a user's purchase options.

Step 330 includes providing both time-sensitive information 332 describing identified products and time-sensitive information 334 describing alternative products to the user device 114. Time-sensitive information 332 and 334 might be presented to the user device 114 in various ways, such as by using presentation components 216 and/or I/O components 220 (see FIG. 2). For example, time-sensitive information can be displayed on a monitor or made audible by using speakers.

Figure 4:
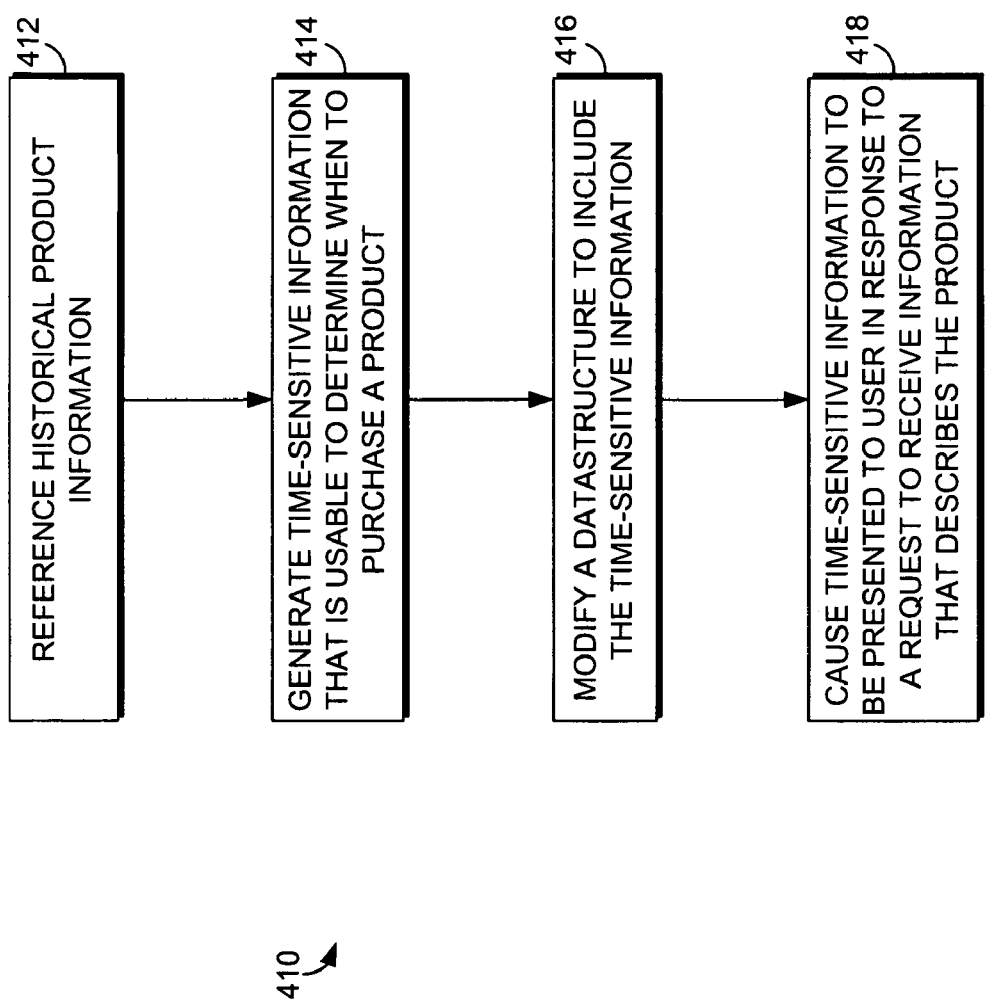

In one aspect, embodiments of the present invention include a computer-implemented method of providing a user with time-sensitive information that is usable to determine when to purchase a given product. Referring now to FIG. 4, one such computer-implemented method, identified generally by numeral 410, is depicted. In one embodiment, method 410 is implemented with one or more of a processor and a computer-readable medium. Method 410 includes at step 412 referencing historical product information that describes the given product and that is usable to predict the time-sensitive information. For example, price-modification trends, product retirement and release trends, and/or sale-transaction statistics might be referenced. Based on the historical product information, at step 414 time-sensitive information is generated, e.g., the projector 138 applies an algorithm and/or model to historical product information. Examples of time-sensitive information include: a projected discontinuation time frame that describes a first predicted future date on which the given product will no longer be available to be purchased; a projected release time frame that describes a second predicted future date on which a new product that is usable to replace the given product will become available to be purchased; and projected competing-product information that describes predicted pricing trends of a competing product, which is usable as an alternative to the given product. Step 416 includes modifying a data structure in a datastore to include the time-sensitive information. For example, a data structure in the projection datastore 140 might be modified. At step 418 the time-sensitive information is caused to be presented to the user in response to a request from the user to receive information that describes the given product.

Figure 5:
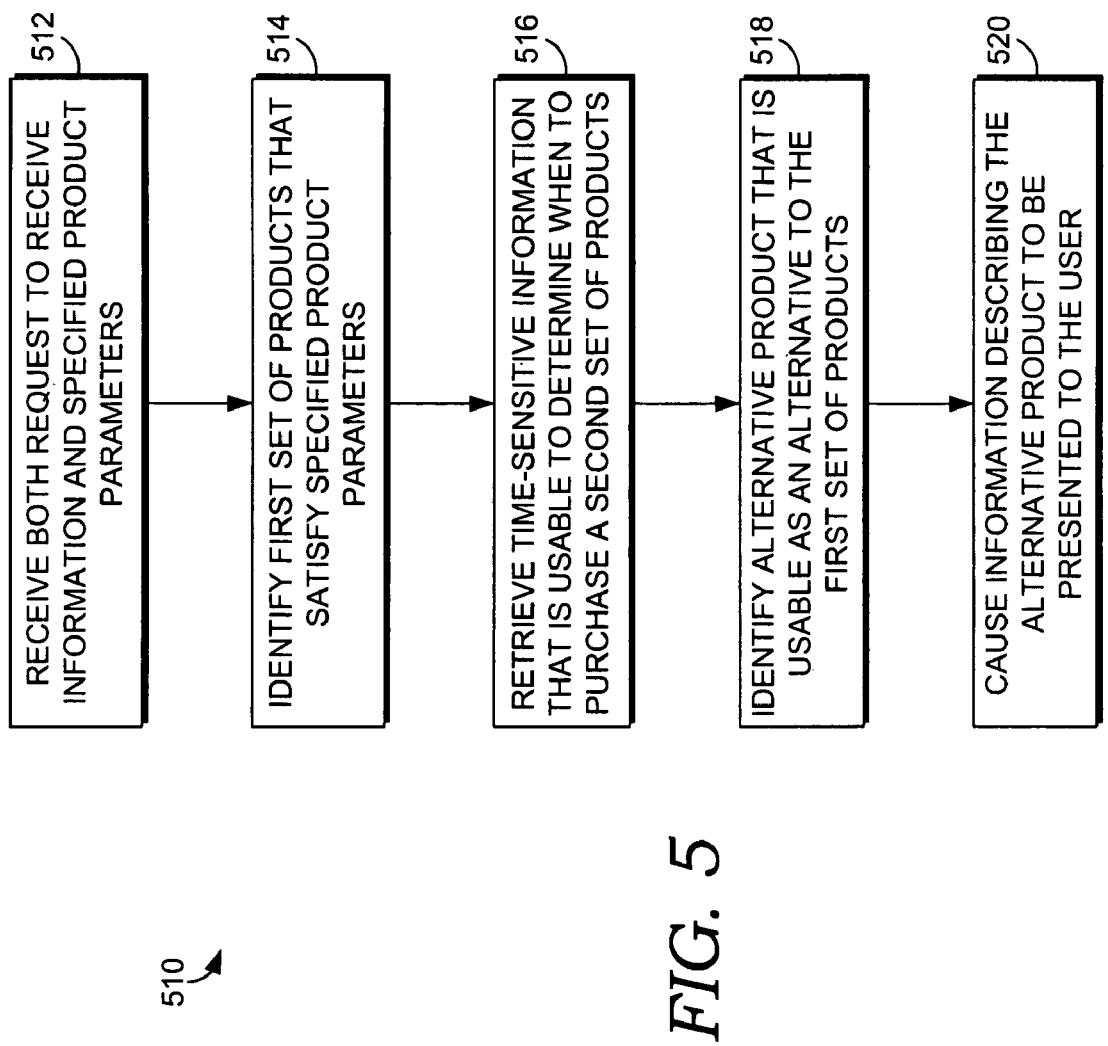

In another embodiment, the present invention includes computer-readable media having computer-executable instructions embodied thereon, that when executed, cause a computing device to perform a method of providing a user with time-sensitive information that is usable to determine when to purchase a product. Referring to FIG. 5, one such method, identified generally by numeral 510, is depicted in which step 512 includes receiving from the user a request to receive information describing products. In one aspect, the request includes specified product parameters that are usable to identify features of the products. Examples of specified product parameters include a purchase price, product brand name, product capabilities, and product specifications.

At step 514 a first subset of the products is identified that satisfies the specified product parameters. In an exemplary embodiment, the first subset of products satisfies the specified product parameters at a time at which the request is received. Step 516 includes retrieving time-sensitive information that is usable to determine when to purchase a second subset of the products, e.g., products that are usable as an alternative to at least one product the first subset of products and that did not satisfy the specified product parameters at a time at which the request is received.

Step 518 includes, based on the time-sensitive information that describes the second subset of the products, identifying an alternative product that is usable as an alternative to the first set of products and that is described by alternative-product parameters. In one embodiment, the alternative-product parameters are predicted to undergo a change on a future date and, due to the change, the alternative-product parameters will satisfy the specified product parameters. For example, product capabilities of an alternative product when the request from the user is received might be less than specified product parameters, i.e., the alternative-product capabilities are inadequate; however, time-sensitive information that describes the alternative product might indicate that a new model will be released that includes higher capabilities that satisfy specified product parameters. Step 520 includes causing information describing the alternative product to be presented to the user.

Figure 6:
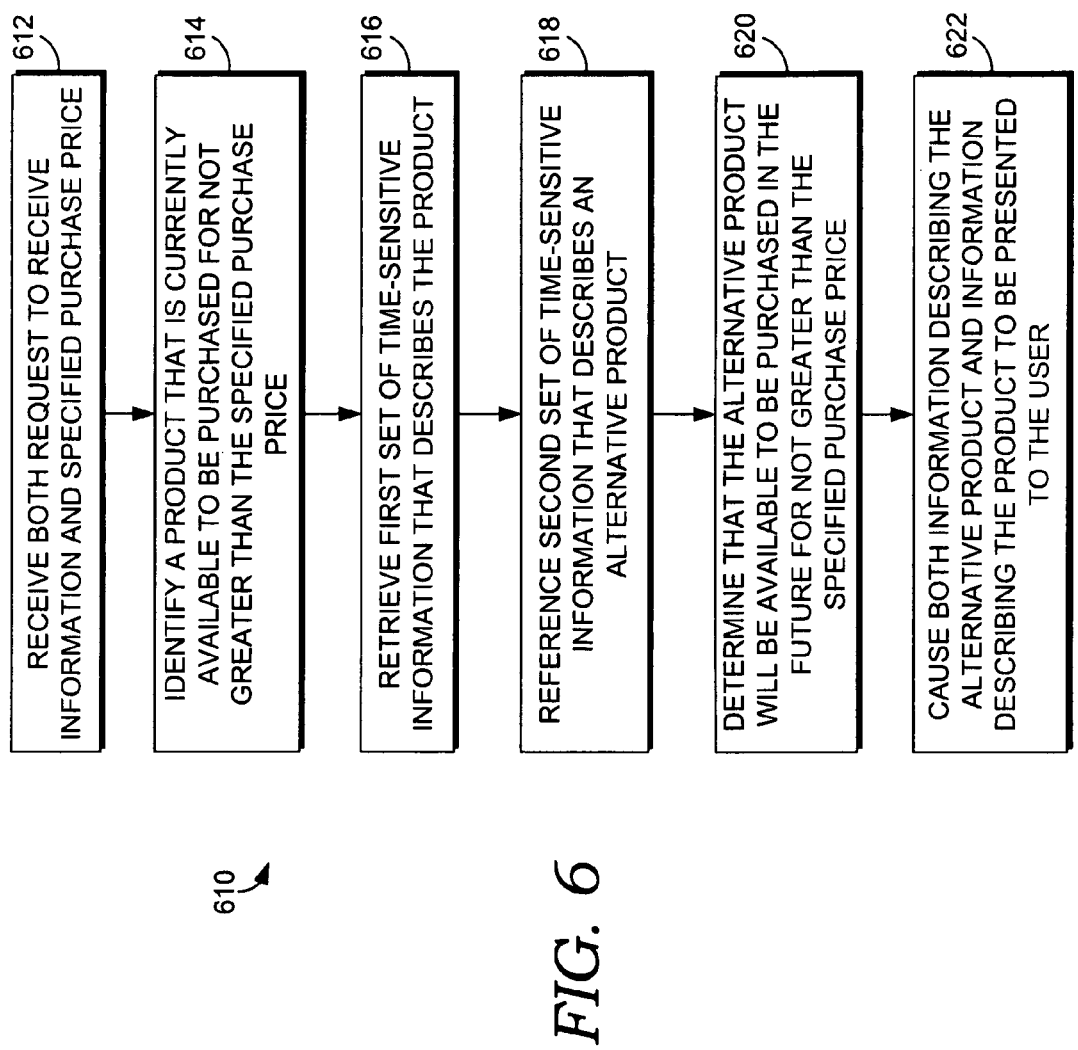

Referring to FIG. 6, another method 610 is described that when embodied on computer-readable media as computer-executable instructions, causes a computing device to provide a user with time-sensitive information that is usable to determine when to purchase a product. Step 612 includes receiving from the user a request to receive information describing one or more products, wherein the request includes a specified purchase price. At step 614 a product is identified that is available to be purchased, wherein the product is available to be purchased both at a time at which the request is received and in exchange for an amount that is not greater than the specified purchase price. Moreover, step 616 includes, retrieving a first set of time-sensitive information. Time-sensitive information can include a projected discontinuation time frame that describes a first predicted future date on which the product will no longer be available to be purchased and a projected release time frame that describes a second predicted future date on which a new product that is usable to replace the product will be available to be purchased. At step 618, a second set of time-sensitive information is referenced that describes predicted information relating to an alternative product, which is both usable as an alternative to the product and available to be purchased at the time the request is received for an amount that is greater than the specified purchase price. Step 620 includes, based on the second set of time-sensitive information, determining that the alternative product will be available to be purchased on a third predicted future date in exchange for an amount that is not greater than the specified purchase price. At step 622, information describing the product is caused to be presented to the user together with information describing the alternative product.

Many different arrangements of the various components depicted, as well as components not shown, are possible without departing from the scope of the claims below. Embodiments of the present invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A computer-implemented method of providing a user with time-sensitive information that is usable to determine when to purchase a given product, the method comprising:
    Retrieving historical product information from at least one computer-readable medium that describes the given product and that is usable to predict the time-sensitive information;
    based on the historical product information, generating, by one or more of a processor, the time-sensitive information, which includes one or more of:
    (1) a projected discontinuation time frame that describes a first predicted future date on which the given product will no longer be available to be purchased; and
    (2) a projected release time frame that describes a second predicted future date on which a new product that is usable to replace the given product will become available to be purchased;
    modifying a data structure in a datastore to include the time-sensitive information; and
    causing the time-sensitive information to be presented to the user in response to a request from the user to receive information that describes the given product.

2. The method of claim 1, wherein the historical product information includes one or more of price-modification trends, sale-transaction information, and trends describing changes in product specifications.

3. The method of claim 2, wherein price-modification trends describe one or more of a decline and an increase in a purchase price that was previously established with respect to the given product.

4. The method of claim 2, wherein sale-transaction information describes total sale-transactions completed in which the given product was purchased during one or more previous time periods.

5. The method of claim 4, wherein the total sale-transactions completed indicates that a market is saturated with the given product.

6. The method of claim 1, wherein the time-sensitive information is generated by applying to the historical product information one or more of a simple moving average model, an exponential moving average model, a random walk model, and a price regression model.

7. The method of claim 1, wherein the given product is a nonperishable product, which will not become unusable at a pre-determined date.

8. The method of claim 1, further comprising:
    identifying an alternative product, which is usable as an alternative to the given product;
    based on historical product information that describes the alternative product, generating alternative time-sensitive information, which is usable to determine when to purchase the alternative product; and
    causing the alternative time-sensitive information to be presented to the user in response to the request from the user to receive information that describes the given product.

9. The method of claim 8, wherein the alternative time-sensitive information describes a predicted pricing trend of the alternative product.

* * * * *